US011651274B2

(12) United States Patent
Abbas

(10) Patent No.: US 11,651,274 B2
(45) Date of Patent: May 16, 2023

(54) METHOD, APPARATUS, AND SYSTEM FOR PROVIDING SEMANTIC FILTERING

(71) Applicant: HERE GLOBAL B.V., Eindhoven (NL)

(72) Inventor: Ali Abbas, Hanau (DE)

(73) Assignee: HERE GLOBAL B.V., Eindhoven (NL)

( * ) Notice: Subject to any disclaimer, the term of this patent is extended or adjusted under 35 U.S.C. 154(b) by 912 days.

(21) Appl. No.: 16/507,797

(22) Filed: Jul. 10, 2019

(65) Prior Publication Data

US 2021/0012235 A1  Jan. 14, 2021

(51) Int. Cl.
*G06N 20/00* (2019.01)
*G06F 16/9035* (2019.01)

(52) U.S. Cl.
CPC ......... *G06N 20/00* (2019.01); *G06F 16/9035* (2019.01)

(58) Field of Classification Search
CPC .......... G06Q 10/00–50/00; G06N 3/00–20/00; G06F 1/00–40/00
USPC .............................. 706/1–900; 705/7.11–7.42
See application file for complete search history.

(56) References Cited

U.S. PATENT DOCUMENTS

| | | | | |
|---|---|---|---|---|
| 7,571,192 B2* | 8/2009 | Gupta | ................... | G06F 16/283 707/999.102 |
| 8,577,938 B2* | 11/2013 | Yeh | ....................... | G06F 16/258 707/964 |
| 9,183,173 B2* | 11/2015 | Yih | ........................ | G06N 20/00 |
| 9,306,962 B1 | 4/2016 | Pinto | | |
| 9,535,981 B2 | 1/2017 | Basak et al. | | |
| 10,868,773 B2* | 12/2020 | Tiwary | ................... | H04L 47/801 |
| 11,204,906 B2* | 12/2021 | LeTourneau | .......... | G06F 16/282 |
| 2004/0024790 A1* | 2/2004 | Everett | ................. | G06F 16/284 |

(Continued)

OTHER PUBLICATIONS

Deokar, Amit V., and Jie Tao. "Semantics-based event log aggregation for process mining and analytics." Information Systems Frontiers 17.6 (2015): 1209 (Year: 2015).*

(Continued)

*Primary Examiner* — Alan S Miller
(74) *Attorney, Agent, or Firm* — Ditthavong, Steiner & Mlotkowski

(57) ABSTRACT

An approach is provided for semantic filtering to filter an input data stream of a data system to reduce an amount of data processed by the data system. The approach, for example, involves retrieving training data comprising a plurality of training data items responsive to a plurality of training queries conducted in a data system. The approach also involves performing a vectorization and a tokenization of the training data to generate a plurality of vectors comprising a plurality of tokens extracted from the plurality of training data items. The approach also involves computing a plurality of reference semantic scores for the plurality of vectors based on a semantic distance between the plurality of tokens. The approach also involves transforming the plurality of reference semantic scores into a plurality of transformed reference semantic scores based on a modulation function. The approach also involves fitting a filtering function to the plurality of transformed reference semantic scores. The approach also involves providing the filtering function to filter an input data stream of the data system to reduce an amount of data processed by the data system.

20 Claims, 11 Drawing Sheets

(56) References Cited

U.S. PATENT DOCUMENTS

2013/0275122 A1* 10/2013 Park .................. G06F 40/30
704/9
2018/0357299 A1 12/2018 Miranda et al.
2019/0339687 A1* 11/2019 Cella .................. G06N 3/0454

OTHER PUBLICATIONS

Verma, Miki E., and Robert A. Bridges. "Defining a metric space of host logs and operational use cases." 2018 IEEE International Conference on Big Data (Big Data). IEEE, 2018. (Year: 2018).*
Wang, Wei, Guangquan Zhang, and Jie Lu. "Collaborative filtering with entropy-driven user similarity in recommender systems." International Journal of Intelligent Systems 30.8 (2015): 854-870. (Year: 2015).*
Nguyen, Kim Anh, Sabine Schulte im Walde, and Ngoc Thang Vu. "Neural-based noise filtering from word embeddings." arXiv preprint arXiv: 1610.01874 (2016). (Year: 2016).*
Levy, "A Machine Learning Approach to Log Analytics", Big Data Zone, Opinion, Jan. 26, 2017, retrieved from https://dzone.com/articles/a-machine-learning-approach-to-log-analytics, pp. 1-9.
Pitakrat et al., "A Framework for System Event Classification and Prediction by Means of Machine Learning", Research Article, Feb. 19, 2015, pp. 173-180.

* cited by examiner

METHOD, APPARATUS, AND SYSTEM FOR PROVIDING SEMANTIC FILTERING

BACKGROUND

Service providers (e.g., information technology (IT) service providers) often are responsible for monitoring IT systems, services, and/or related networks for alerts indicating possible alarm conditions or other network events that require action by operational personnel (e.g., actionable alerts). Depending on the complexity of the monitored systems, these monitored systems can generate large volumes of event log data to process. In many cases, the collected log data can include extraneous or unnecessary data (e.g., duplicate or false event logs). This extraneous data can result in unnecessary use of resources (e.g., computational, memory, bandwidth, etc. resources) to process. Accordingly, data service providers face significant technical challenges with respect to efficiently and accurately filtering data (e.g., event log data) in a way that can be scaled to large volumes of data while also ensuring that relevant data (e.g., actionable event logs) are maintained.

SOME EXAMPLE EMBODIMENTS

Therefore, there is a need for providing semantic filtering to improve, for example, cost efficiency and scalability of data collection systems (e.g., a cloud-based logging infrastructure or other similar data system that collects large amounts of data).

According to one embodiment, a method for providing semantic filtering comprises retrieving training data comprising a plurality of training data items responsive to a plurality of training queries conducted in a data system. The method also comprises performing a vectorization and a tokenization of the training data to generate a plurality of vectors comprising a plurality of tokens extracted from the plurality of training data items. The method further comprises computing a plurality of reference semantic scores for the plurality of vectors based on a semantic distance between the plurality of tokens. The method further comprises transforming the plurality of reference semantic scores into a plurality of transformed reference semantic scores based on a modulation function. The method further comprises fitting a filtering function to the plurality of transformed reference semantic scores. The method further comprises providing the filtering function to filter an input data stream of the data system to reduce an amount of data processed by the data system.

According to another embodiment, an apparatus for providing semantic filtering comprises at least one processor, and at least one memory including computer program code for one or more computer programs, the at least one memory and the computer program code configured to, with the at least one processor, cause the apparatus to retrieve training data comprising a plurality of training data items responsive to a plurality of training queries conducted in a data system. The apparatus is also caused to perform a vectorization of the training data to generate a plurality of vectors extracted from the plurality of training data items. The apparatus is also caused to compute a plurality of reference scores for the plurality of vectors based on a difference between the plurality of vectors. The apparatus is also caused to transform the plurality of reference scores into a plurality of transformed reference scores based on a modulation function. The apparatus is also caused to fit a filtering function to the plurality of transformed reference scores. The apparatus is also caused to provide the filtering function to filter an input data stream of the data system to reduce an amount of data processed by the data system.

According to another embodiment, a non-transitory computer-readable storage medium for providing semantic filtering carries one or more sequences of one or more instructions which, when executed by one or more processors, cause, at least in part, an apparatus to retrieve training data comprising a plurality of training data items responsive to a plurality of training queries conducted in a data system. The apparatus is also caused to perform a vectorization and a tokenization of the training data to generate a plurality of vectors comprising a plurality of tokens extracted from the plurality of training data items. The apparatus is also caused to compute a plurality of reference semantic scores for the plurality of vectors based on a semantic distance between the plurality of tokens. The apparatus is also caused to transform the plurality of reference semantic scores into a plurality of transformed reference semantic scores based on a modulation function. The apparatus is also caused to fit a filtering function to the plurality of transformed reference semantic scores. The apparatus is also caused to provide the filtering function to filter an input data stream of the data system to reduce an amount of data processed by the data system.

According to another embodiment, an apparatus for providing semantic filtering comprises means for retrieving training data comprising a plurality of training data items responsive to a plurality of training queries conducted in a data system. The apparatus also comprises means for performing a vectorization and a tokenization of the training data to generate a plurality of vectors comprising a plurality of tokens extracted from the plurality of training data items. The apparatus further comprises means for computing a plurality of reference semantic scores for the plurality of vectors based on a semantic distance between the plurality of tokens. The apparatus still further comprises means for transforming the plurality of reference semantic scores into a plurality of transformed reference semantic scores based on a modulation function. The apparatus still further comprises means for fitting a filtering function to the plurality of transformed reference semantic scores. The apparatus still further comprises means for providing the filtering function to filter an input data stream of the data system to reduce an amount of data processed by the data system.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing semantic filtering are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
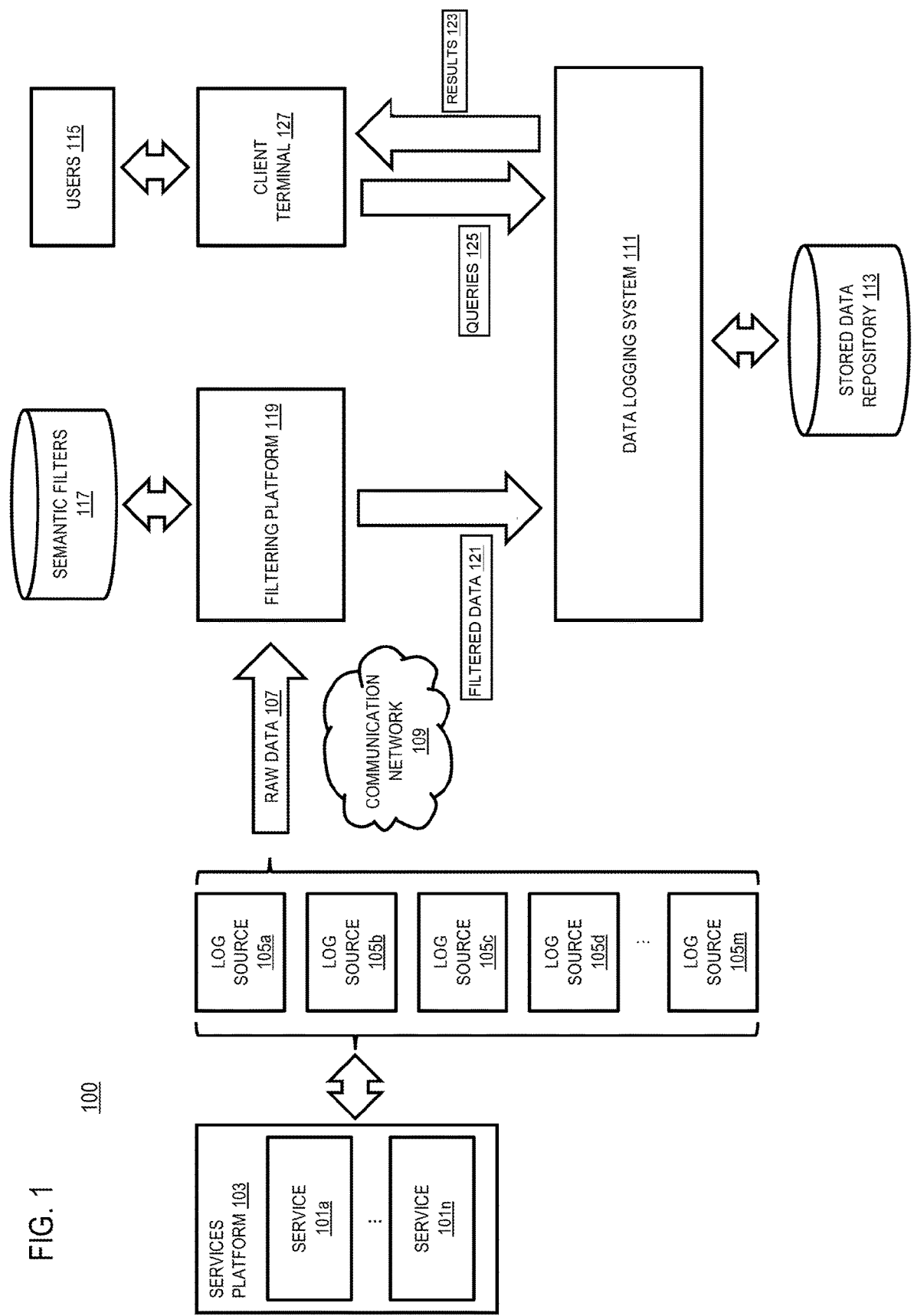
FIG. 1 is a diagram of a system capable of providing semantic filtering according to one embodiment.

FIG. 1 is a diagram of a system capable of providing semantic filtering according to one embodiment. Organizations that provide information technology (IT) services, applications, networks, devices, etc. have traditionally employed tools to monitor machine-generated data resulting from their operations. This monitoring, for instance, helps to ensure that these IT services, applications, etc. are performing according to specification (e.g., minimum service uptime, minimum number of errors, incident response time, etc.). A typical organization with a large portfolio of services, applications, etc. (e.g., services 101a-101n of the services platform 103—also collectively referred to as services 101) may often perform constant monitoring (e.g., 24 hours by 7 days a week) of the services 101 using a number of monitoring tools and systems (e.g., log sources 105a-105m—also collectively referred to alarm sources 105) to generate raw data 107 (e.g., raw log data indicating events detected or monitored by the reporting tools). Traditionally, the raw data 107 is forwarded over a communication network 109 to a data logging system 111 for storage in a stored data repository 113. Because of the constant monitoring and potentially large number of log sources 105, the amount of raw data 107 generated can be very high, resulting in high resource usage (e.g., computational, memory, storage, bandwidth, etc. resources). For example, in a typical use case, a network operations center (NOC) can receive over tens of thousands of logged data items per month when monitoring a suite of services 101 resources and stored by a data logging system. However, a large percentage of the logged events has traditionally been non-actionable or not relevant for NOC personnel to act on (e.g., duplicate events, false alarms, etc.). As a result, the NOC or responsible organization can expend a considerable amount of resources and money processing potentially irrelevant or non-actionable logged data items.

Traditionally, entities hosting or generating large datasets (such as cloud-based data hosts) may use static filters, such as content-based filters or source-based filters to reduce and/or streamline the amount of data that is ingested by the data logging system 111 and sent to the stored data repository 113. Historically, to reduce the amount of raw data 107 that is to be ingested by the data logging system 111, static filters are implemented to remove logs or other data items in the raw data 107 that are of no interest for users of the system 100 either because the need never arose, the need changed over time, or simply because of seasonality. However, static filters rely on experts to specify filtering terms or parameters to work. Therefore, static filters are not easily scalable as the amount of raw data 107 increases or the numbers or complexities of users increases.

In addition, because one might never know which log or data item in the raw data 107 will be needed by an end user (e.g., users 115), static filters may not be effective. This lack of knowledge about what might be relevant to users 115 can be referred to as an ill-posed problem. To avoid this ill-posed problem, in some cases data system administrators resolve to always send all raw data 107 (e.g., system logs) to the data logging system 111 in the hope that they might be useful to users 115. Additionally, because traditional log or data filtering systems are not universally defined (e.g., because they generally require strict matching and are domain exclusive, i.e., dependent on the interests of end users 115 that may be different between different users 115), it has not been historically feasible to implement log or data server filters directly on the source endpoints.

For a large dataset of data that is to be used in an unknown context, implementing and aggregating static filters in a systematic way tends to be computationally expensive and presents exclusivity problems when daisy-chained with various filtering rules. Also, for a large dataset hosted by a remote provider, there may be obstacles to implementing pre-filtering upon the dataset as data is ingested, as well as potential challenges due to non-interoperability between server-side filters and storage-side filters. This leads to one expert system and a simple system. An expert system is defined as a system with complex filters; often this is the storage-side system. The server-side remains a simple system which means ingestion and storage costs may be wasted for statistically less relevant data.

In summary, there are several known technical challenges or problems associated with traditional static filtering. For example, queries exist generally as an answer to the ill-posed problem of filtering data that is to be used in an unknown context. In many contexts, such as in the context of log data, it might not be possible to assess with confidence whether a data item, such as a log line, is useful today or in the future. Therefore, server-side filters tend to be source selective rather than content selective. Also, duplication of queries and/or filters may lead to system slowdown. Duplication is expressed as semantically identical or near-identical queries. Near-identical queries may be defined as syntax-different queries with similar geometrical distance to a baseline. For example, in the context of an illustrative log based infrastructure, a query for a log line containing "H=10" and a query for a log line containing "H=11" may be near-identical. Although a static filter may provide the log data to satisfy such illustrative log queries, the data provided for the query may be unnecessarily over-inclusive, resulting in increased computer processing and data transmission requirements to satisfy the query.

To address these challenges and issues, the system 100 of FIG. 1 introduces a technical capability to improve filtering of large datasets by generating adaptive semantic filters 117 that can be used by filtering platform 119 to generate filtered data 121 from the raw data 107. The filtered data 121 (e.g., reduced in data volume in comparison to the raw data 107) can then be ingested by the data logging system 111 (e.g., a Splunk system or equivalent) to reduce the computing resources and/or expense associated with ingesting unfiltered raw data 107. In one embodiment, the semantic filters 117 are generated by computing the semantic distance and scores of the results 123 of previously observed queries 125 performed by users 115 of the data logging system 111 via a client terminal 127 to abstract the content streams of the raw data 107 into a statistical distribution. Semantic distance refers to how closely related in meaning are any two or more attributes. The amplitudes of the semantic scores of the streams in the raw data 107 can then be modeled using a wave function (e.g., signal-like waves) to which a polynomial function can be fit. The obtained polynomial function can then be used to filter incoming raw data streams by computing the semantic relevance scores of the incoming streams to determine whether the scores are above or below the curve defined by the polynomial function. By representing the raw data by semantic distance or scores to generate semantic filters, the system 100 solves the ill-posed problem of the traditional approaches described above by: (1) learning from user queries on the fly, and (2) predicting which raw data items (e.g., logs) not seen before has close semantic relevance to past observations.

In contrast, traditional approaches to filtering may make use of k-means techniques to discover outlier or group patters. This means that traditional approaches organize a volume of the dataset into small clusters that can be stored accordingly. In one embodiment, the system 100 does not use k-means but uses neighbor discovering and signal analysis to create a statistical distribution that is then used to predict if a single item of raw data 107 belongs to this distribution to determine whether or not to filter the item. In other words, the system 100 provides a statistical distribution (e.g., of semantic relevance scores determined from observed queries 125 and their results 123) which can be exploited to map the semantic distance or score of an input data stream to accurately predict whether a new observed input stream fits this distribution and as such a learned semantic filter. So rather than grouping by text data, the system 100 groups an incoming stream in terms of its semantic distance amplitude mapped to a statistical distribution. This means that the system 100 need not evaluate a text line in context of a set of data (e.g., in the raw data 107) but rather predict the projected signal amplitude of the text line semantic distance.

Moreover, unlike traditional static filters that are strict matching, the semantic filters 117 of the system 100 requires little retraining of the base dataset and provides high accuracy filtering of newly observed data points by exploiting localities in the amplitude curves already seen in statistical distributions of the semantic distances of results 123 that are relevant to previously observed queries 125. In one embodiment, these distributions are mapped essentially of tokens (e.g., words) appearing in the results 123. This means that at any time, the system 100 learns the correct bounds and the gradient to fit any unseen prior or possible relating to the input stream.

In summary, the system 100 provides several advantages including but not limited to: (1) end-to-end adaptive, non-static filtering system which quickly learns from queries to provide input filtering to reduce log processing; (2) capabilities to generalize multiple semantic filters into one distribution to provide precise fitting and matching for unseen data or malformed data; and (3) categorization of newly seen data without prior context of the data to avoid domain exclusivity.

It noted that although the various embodiments are discussed with respect to providing semantic filtering in the context of a data logging system 111, it is contemplated that the embodiments described herein are applicable to any data system that ingests data. For example, in a location-based or mapping context, the data system to which semantic filtering applies can include a mapping platform that is ingesting sensor data, traffic incident reports, context data reports, etc. to create maps, provide navigation, provide real-time traffic/incident data, etc.

Figure 2:
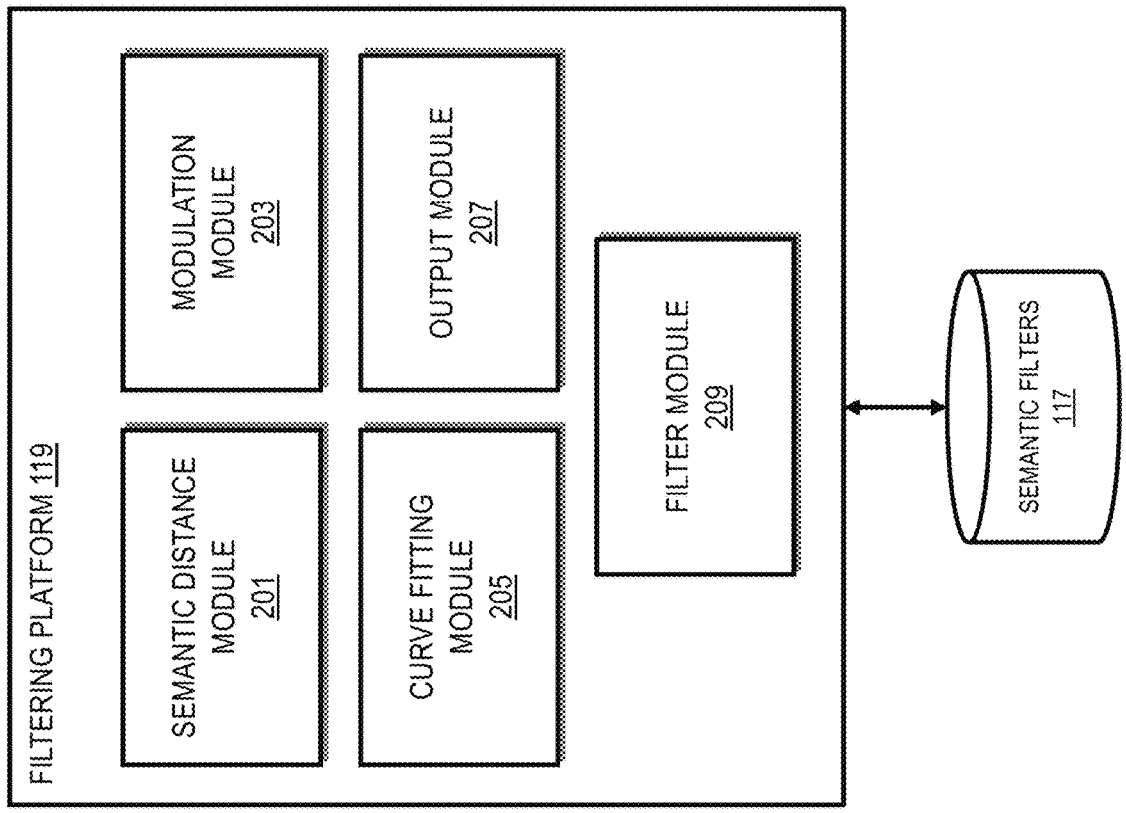
FIG. 2 is a diagram of components of a filtering platform, according to one embodiment.

In one embodiment, the system 100 includes a filtering platform 119 capable of providing semantic filtering according to the embodiments described herein. As shown in FIG. 2, the filtering platform 119 includes one or more components for providing semantic filtering, according to the various embodiments described herein. It is contemplated that the functions of these components may be combined or performed by other components of equivalent functionality. In this embodiment, the filtering platform 119 includes a semantic distance module 201, modulation module 203, curve fitting module 205, output module 207, and filter module 209. The above presented modules and components of the filtering platform 119 can be implemented in hardware, firmware, software, or a combination thereof. Though depicted as a separate entity in FIG. 1, it is contemplated that the filtering platform 119 may be implemented as a module of any other component of the system 100 (e.g., a component of the services platform 103, services 101, data logging platform 111, client terminal 127, etc. In another embodiment, the filtering platform 119 and/or one or more of the modules 201-209 may be implemented as a cloud-based service, local service, native application, or combination thereof. The functions of the filtering platform 119 and the modules 201-209 are discussed below.

Figure 3:
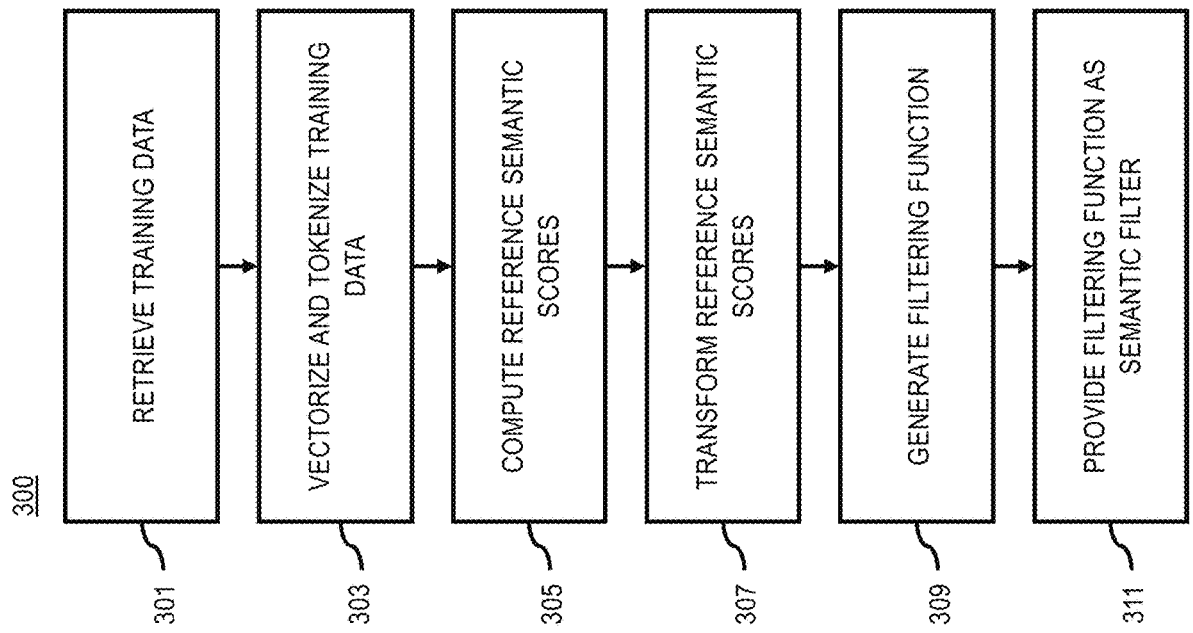
FIG. 3 is a flowchart of a process for providing semantic filtering, according to one embodiment.
Figure 10:
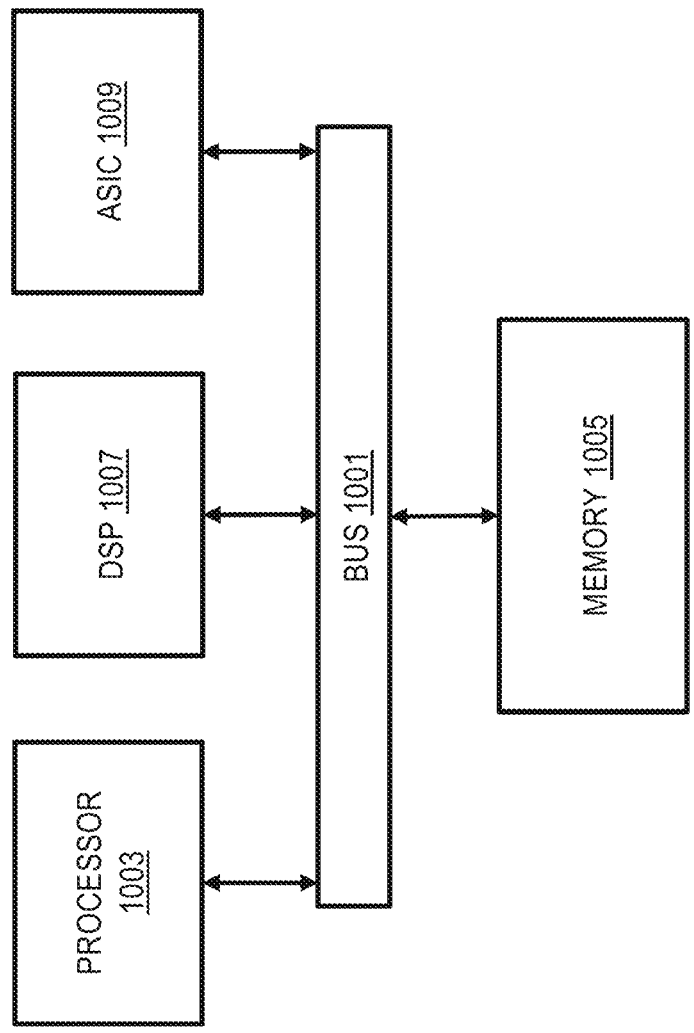
FIG. 10 is a diagram of a chip set that can be used to implement an embodiment.

FIG. 3 is a diagram of a process flow 300 for providing a semantic filter, according to one embodiment. In various embodiments, the filtering platform 119 and/or any of the modules 207-209 may perform one or more portions of the process flow 300 and may be implemented in, for instance, a chip set including a processor and a memory as shown in FIG. 10. As such, the filtering platform 119 and/or any of the modules 207-209 can provide means for accomplishing various parts of the process flow 300, as well as means for accomplishing embodiments of other processes described herein in conjunction with other components of the system 100. Although the process flow 300 is illustrated and described as a sequence of steps and functions, it is contemplated that various embodiments of the process flow 300 may be performed in any order or combination and need not include all of the illustrated steps.

In step 301, the semantic distance module 201 retrieves training data comprising a plurality of training data items responsive to a plurality of training queries conducted in a data system (e.g., the data logging system 111). In one embodiment, the training data includes the queries 125 that have been performed by users 115 to retrieve data (e.g., results 123) from the stored data repository 113 of the data logging system 111. For example, a developer of one or more services 101 that are being monitored or log may query the data logging system 111 for log indicating a specified code error (e.g., Java error) using a word associated with the error as a query parameter. In one embodiment, the data logging system 111 or other component can maintain a record of the query as well as the results provided in response to the query as training data. As the users 115 perform additional queries, these queries and corresponding results can be stored as additional training data. In this way, the training data will represent a data set including data that have been determined to be relevant to the users 115 based on their queries. The training data can include a variety or diverse set of queries (e.g., 100 different queries or more) that are representative of the queries performed by the users 115. Alternatively, the queries can be targeted more specifically to a subset of users 115 or intended application (e.g., code development, network operations monitoring, etc.).

In one embodiment, data in the stored data repository 113 that have not been provided in response to any queries or a number of queries below a threshold value are likely to be extraneous and therefore can be candidates for filtering. In other words, the filtering platform 119 uses whether a data item has been queried for as a proxy or indicator of relevance of the data to users 115 of the data logging system 111.

In one embodiment, the semantic distance module 201 can retrieve all or a subset (e.g., last 3 months, 6 months, etc.) of historical queries/results as training data. In one embodiment, the semantic distance module 201 can partition the data into training data and testing/validation data for training a machine learning model to predict a semantic distance or score as further described below.

In step 303, the semantic distance module 201 performs a vectorization and/or a tokenization of the training data to generate a plurality of vectors comprising a plurality of tokens extracted from the plurality of training data items. For example, for each data item (e.g., log line) in the retrieved training data, the semantic distance module can extract tokens (e.g., individual words or elements) included in the data item and generate a vector representation of each data item based on the extracted tokens. In one embodiment, the vector representation is based on a computed semantic distance between the extract tokens included in the vector (step 305). In addition or alternative, the computed semantic distance can be between each token and the tokens in the corresponding query. In one embodiment, the computed semantic distances for the training data can be used as reference or ground truth values.

Figure 4:
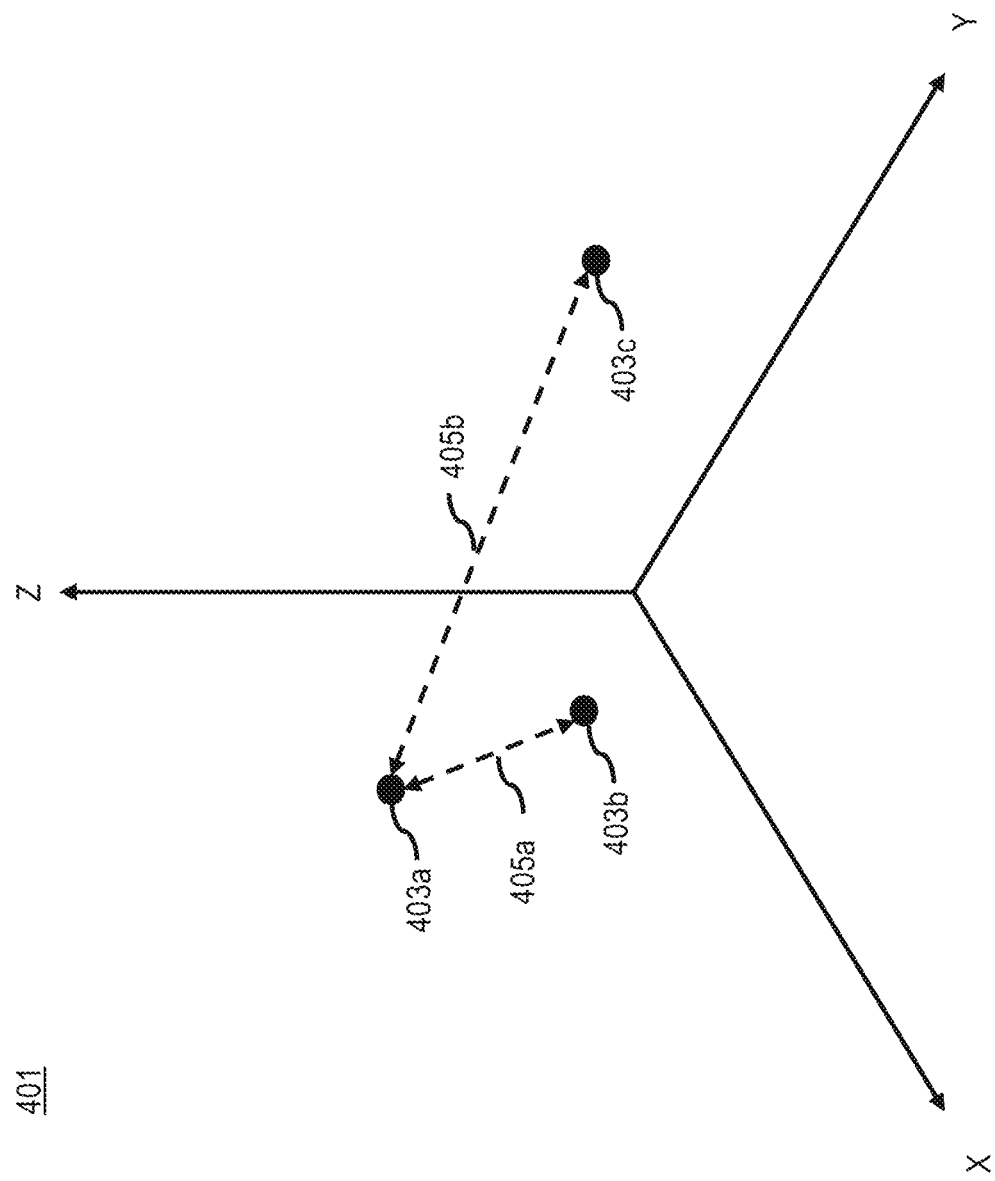
FIG. 4 is a diagram illustrating an example of a semantic distance space, according to one embodiment.

Semantic distance, for instance, refers to how closely related in any two or more tokens/words are with respect to meaning. FIG. 4 is a diagram illustrating an example of semantic distance, according to one embodiment. In the example of FIG. 4, a semantic space 401 having three dimensions (e.g., X, Y, and Z corresponding to respective tokens) is shown. This semantic space 401 corresponds to the semantic space predicted by a natural language processor (or equivalent machine learning system) based on a loss function that optimizes the semantic distances between the tokens 403a-403c according to the semantic relationships between the tokens 403a-403c. In this example, the semantic distance 405a between tokens 403a and 403b is shorter than the semantic distance 405b between tokens 403a and 403c. This means that tokens 403a and 403b are more semantically related than tokens 403a and 403c.

By way of example, the semantic distance or score D (x, x') between a first vector x comprising a set of tokens $x_d$ and a second vector x' comprising a set of tokens $x'_d$ can be computed according to the following equation or equivalent:

$$D(x,x') = \sqrt[p]{\Sigma_d |x_d - x'_d|^p}$$

In one embodiment, the semantic distance module 201 can compute the semantic distance for each data element or item in the training data to use as ground truth data to train a machine learning model to predict the semantic distance or score given an input data item (e.g., log line). In other words, the training data is processed so that each query and corresponding results (e.g., one or more log lines or data items responsive to the associated query) has a computed set of semantic distances. This can, for instance, result in a table of computed semantic distance scores as shown in the example of Table 1 below.

TABLE 1

| Query 1 | Result 1-1 | Semantic Score 1-1 |
| | Result 1-2 | Semantic Score 1-2 |
| Query 2 | Result 2-1 | Semantic Score 2-1 |
| | Result 2-2 | Semantic Score 2-2 |

In one embodiment, the semantic distance module 201 can use the vectors and corresponding semantic distances/scores of the training data to train a machine learning model to predict semantic distances or scores. For example, during training, the semantic distance module 201 feeds vectors and semantic distances into the machine learning module to compute a predicted set of semantic distances or scores using an initial set of model parameters. The semantic distance module 201 then compares the predicted semantic distances to the ground truth distances (e.g., as computed in Table 1). The semantic distance module 201, for instance, computes a loss function based on the initial set of model parameters such that the loss function optimizes the accuracy of predicted semantic distances.

In one embodiment, the semantic distance module 201 incrementally adjusts the model parameters until the model maximizes the accuracy of the predictions using the loss function (e.g., achieves a target maximum and/or minimum accuracy level separation). In other words, a "trained" machine learning model has parameters (e.g., coefficients, weights, etc.) adjusted to make predictions of semantic distances or scores with a target level of accuracy.

In step 307, the modulation module 203 transforms the plurality of reference semantic scores into a plurality of transformed reference semantic scores based on a modulation function. In one embodiment, a sine function may be used as the modulation function. However, other equivalent modulation functions, such as a combination of wave functions or a polynomial function, may be used. The modulation function converts the amplitudes of the reference scores into a signal-like curve using a wave function (e.g., a sine function or equivalent) to find recurring patterns in the amplitudes of the modulated semantic scores across a statistical distribution.

Figure 5:
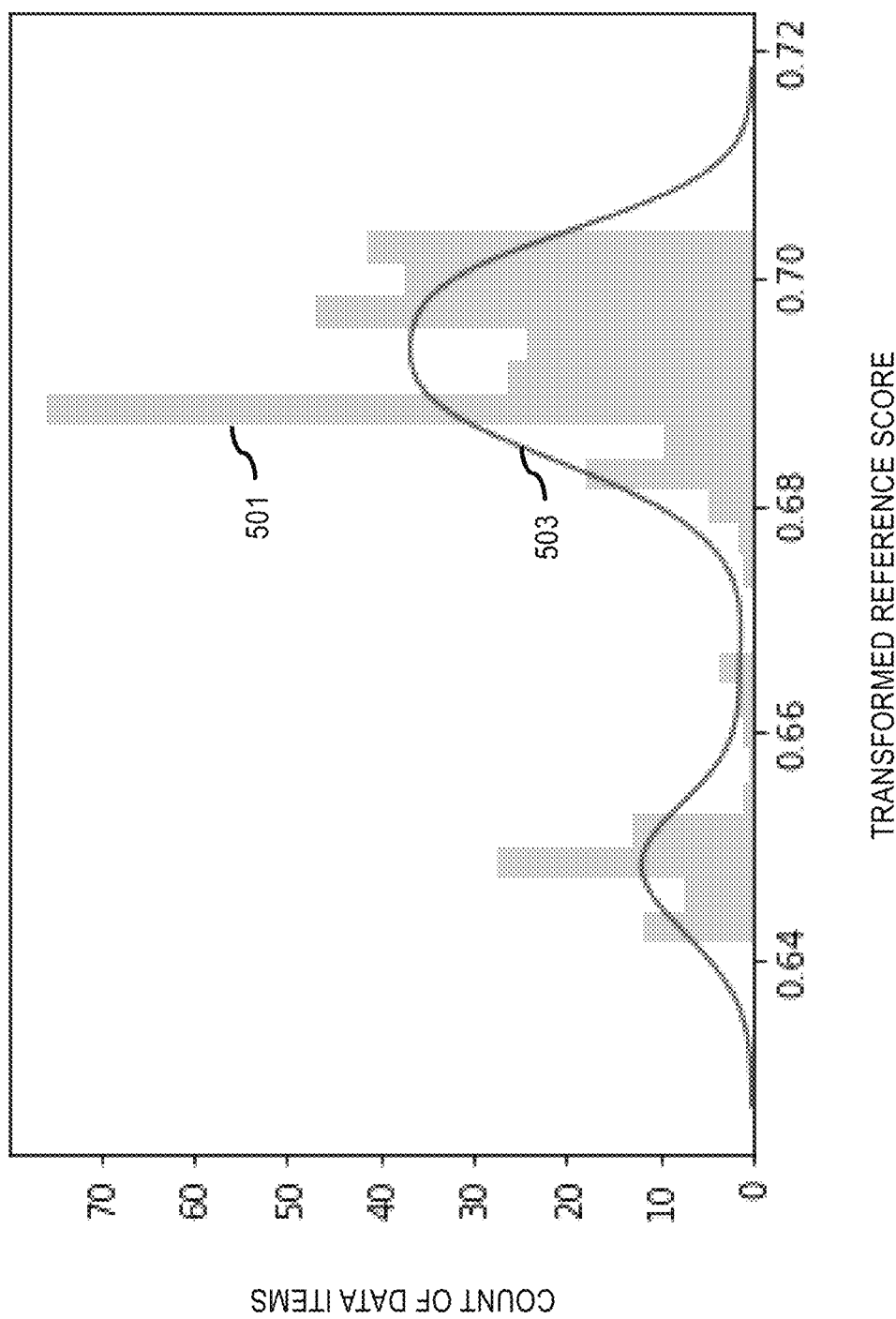
FIG. 5 is a graph depicting a statistical distribution curve generated from a plurality of reference score values plotted according to an underlying histogram, according to one embodiment.

As shown in FIG. 5, this signal-like curve is apparent, for instance, when the reference semantic scores arranged in a histogram 501 to create statistical distribution. In this example, the following modulation function has been applied to the semantic scores to normalize the scores between 0.00 and 0.75:

$$\text{Transformed Score} = \sin RP \times 0.75$$

where RP is the untransformed reference semantic score. In the example of FIG. 5, recurring patterns or peaks of the modulated semantic scores are found, for instance, between scores 0.64 and 0.66 and scores 0.68 and 0.71. This means that data items that are likely to be responsive or relevant to observed user queries 125 have semantic score amplitudes in these ranges. Conversely, data items with scores outside of these ranges are likely to not be relevant (e.g., and there should be filtered).

In step 309, the curve fitting module 205 fits or generates a filtering function to the plurality of transformed reference semantic scores. By way of example, the filtering function can be a polynomial function of any n degrees that best fits the amplitude of the modulated or transformed reference semantic scores. In one embodiment, the signal curve is described with respect to a histogram with the data item count on the y-axis and the amplitude of the modulated reference semantic score on the x-axis of the histogram or statistical distribution. FIG. 5 further illustrates an example of a polynomial defining a curve 503 that is fit to the underlying histogram 501. In one embodiment, the curve fitting module 205 determines a polynomial filtering function $f(x)$ the following conditions are satisfied:

$$x \neq x' \cup x \text{ in } X \text{ with semantic distance } \varepsilon \text{ of } x' \text{ and } \varepsilon > 0$$
$$\text{then } f(x') > f(x) \text{ or } f(x') < f(x)$$

In one embodiment, the polynomial function defines a curve that is best fit to the observed score amplitudes in the statistical distribution that advantageously enables the filtering platform 119 perform a comparison of input scores against the curve using a polynomial fit function. For example, the area under the curve of the filtering function can be used to define the semantic distances of data items that have potentially relevant or responsive that should not be filtered and the area above the curve corresponds to data items that have potentially non-responsive data that should be filtered. In one embodiment, the filtering platform 119 can also define a threshold distance around the amplitudes defined by the curve that can be used to determine the amplitudes that should be filtered or not filtered. Accordingly, in step 311, the output module 207 can provide the filtering function (e.g., polynomial function) to filter an input data stream of the data system (e.g., the data logging system 111 or other data ingestion system) to reduce an amount of data processed by the data system. An example of using the filtering function is described with respect to FIG. 6 below.

Figure 6:
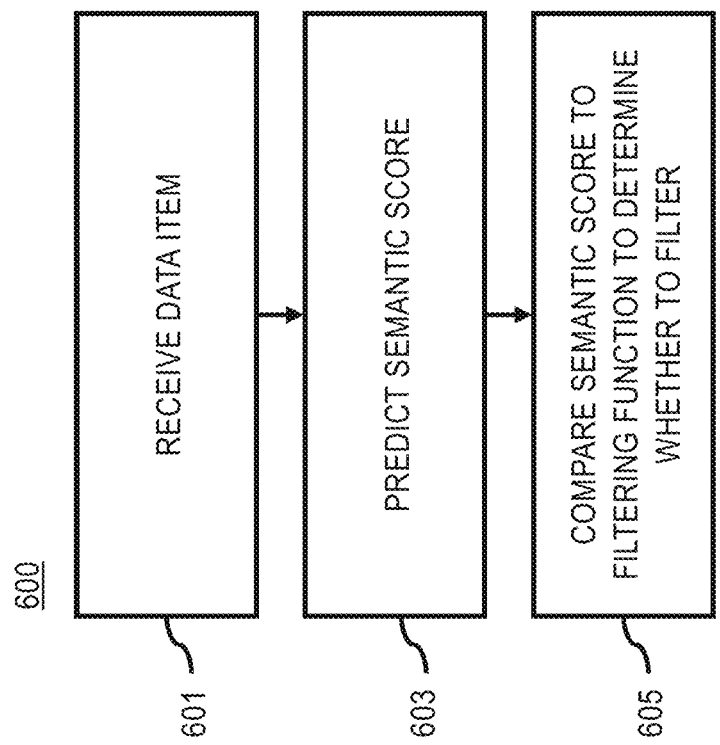
FIG. 6 is a flowchart of a process for using semantic filtering, according to one embodiment.

FIG. 6 is a diagram of a process flow 600 for using a semantic filter, according to one embodiment. In various embodiments, the filtering platform 119 and/or any of the modules 207-209 may perform one or more portions of the process flow 300 and may be implemented in, for instance, a chip set including a processor and a memory as shown in FIG. 10. As such, the filtering platform 119 and/or any of the modules 207-209 can provide means for accomplishing various parts of the process flow 300, as well as means for accomplishing embodiments of other processes described herein in conjunction with other components of the system 100. Although the process flow 300 is illustrated and described as a sequence of steps and functions, it is contemplated that various embodiments of the process flow 300 may be performed in any order or combination and need not include all of the illustrated steps. In one embodiment, the process flow 600 assumes that a semantic filter has been created according to the embodiments of the process flow 300 of FIG. 3 or equivalent.

In step 601, the filtering module 209 receives a data item to be processed. By way of example, the data item can be a candidate for ingestion by a data system (e.g., the data logging system 111). The filtering platform 119 can act as a data broker between the data sources (e.g., log sources 105) and the data logging system 111 to apply semantic filters 117 to reduce the amount of data that is to be processed and/or stored by the data logging system 111.

In step 603, the filtering module 209 can process the data item to predict a semantic distance or score for the data item. In one embodiment, the filtering module 209 can vectorize and/or tokenize the data item as described in the process flow 300, and then provide the resulting vector or tokens as input features for a machine learning module trained to make the prediction. The training of the machine learning model can be performed as described in the embodiments of the process flow 300.

In step 605, the filtering module 209 determines to filter or to not filter the data item from a data stream to be ingested by a data system based on a comparison of the semantic score to a filtering function. As discussed above, the filtering function can be generated according to embodiments of the process flow 300. For example, the filtering function can be a polynomial that defines a curve delineating a plurality of semantic score amplitudes that differentiate between a filterable data item and a non-filterable data item. In one embodiment, the semantic score of the data item being evaluated can be compared by applying a polynomial fit function (e.g., a PolyFit function) of the computed semantic score against the polynomial of the filtering function. In addition, the semantic score can be transformed according to the same modulation function to transform the amplitude of the semantic score that was used to generate the filtering function. In yet another embodiment, the filtering module 209 can perform an under the curve check of the semantic score to determine whether to filter or not filter the data item. In this case, the filtering module 209 can allow the data to be ingested if the semantic score falls under the curve of the filtering function or can filter the data if the semantic score is above the curve.

In one embodiment, the filtering module 209 can repeat the process flow 600 for each new data item that is to be evaluate for possible filtering. The filtering can be performed in real-time or near real-time as the data is collected or reported from the log sources 105 or other data sources. Alternatively, the data can be filtered in a batch process at defined time intervals or when a predetermined amount of data has been collected for ingestion. In one embodiment, the filtering can be performed automatically or can be manually initiated.

Figure 7:
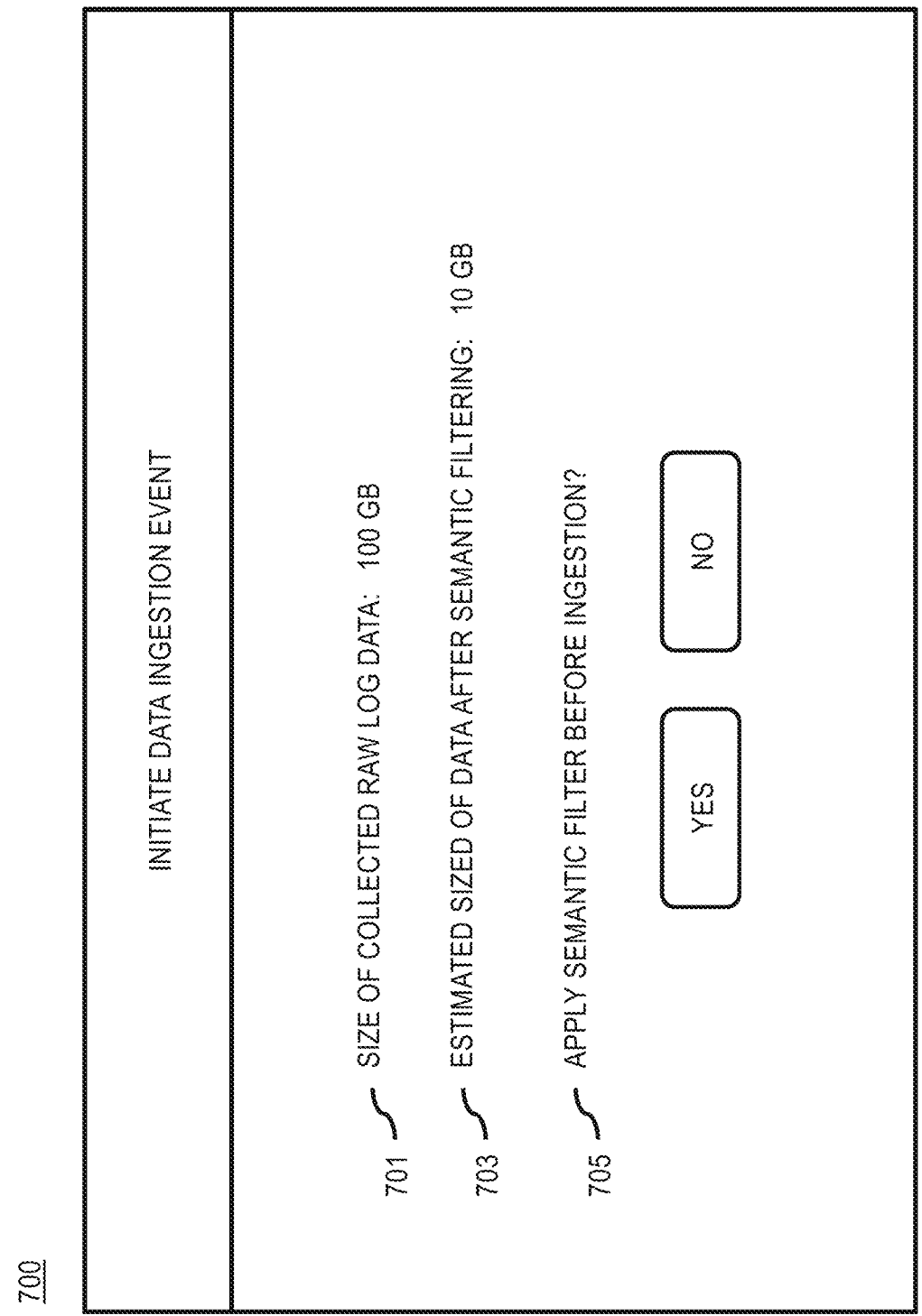
FIG. 7 is a diagram of an example user interface for providing semantic filtering, according to one embodiment.

FIG. 7 illustrates an example user interface (UI) 700 for manually initiating a semantic filter, according to one embodiment. In the example of the FIG. 7, the filtering platform 119 is configured to cached collected log data before ingestion to the data logging system 111. At a fixed interval, the filtering platform 119 presents the UI to a system administrator or other user to determine whether to initiate semantic filtering according to the embodiments described herein. The UI 700 can present a UI element 701 indicating the size of the collected raw log data (e.g., 100 GB) and a UI element 703 indicting the estimated size of the data to ingest after semantic filtering (e.g., 10 GB). The UI 700 can then present a UI element 705 that provides an option for the user to apply the semantic filter before the data is ingested by the data logging system 111.

Figure 8:
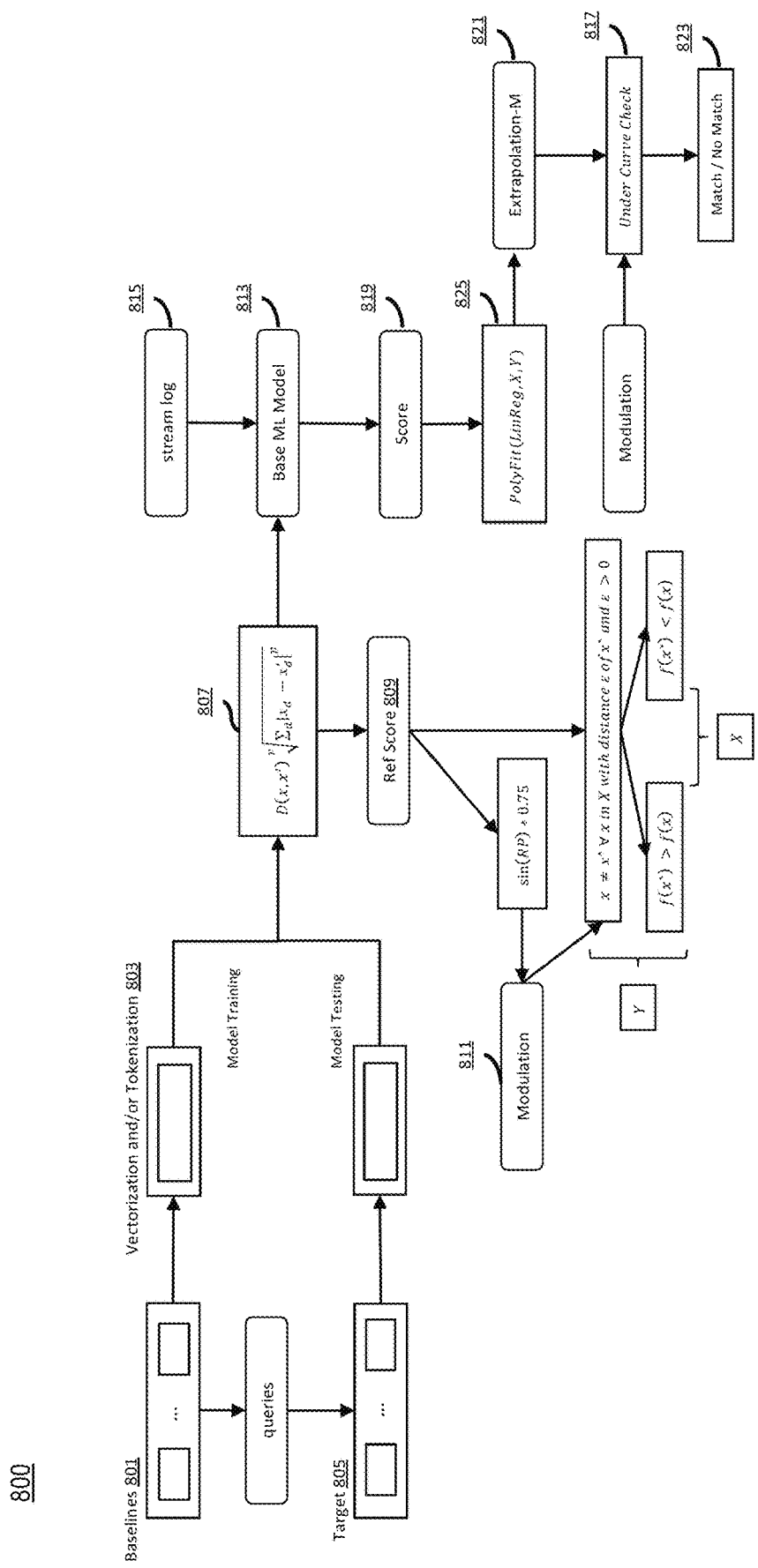
FIG. 8. is a diagram of a process flow that summarizes the end-to-end system for generating and using semantic filters, according to one embodiment.

FIG. 8. is a process flow 800 that summarizes the end-to-end system for generating and using semantic filters, according to one embodiment. In one embodiment, the process flow 800 begins by training the illustrative filtering platform 119. In this embodiment, the filtering platform 119 is described in the context of a data logging infrastructure. Illustratively, the machine learning model of the filtering platform 119 is trained using training queries directed to the dataset and corresponding query results (e.g., historically performed or observed queries by users 115). This training data provides historical queries and responsive data items which may then be divided into baselines 801 for training the machine learning model and target data 805 for testing or validating the model after training. The training data may then be vectorized and/or tokenized at element 803 of the process to generate vectors comprising tokens extracted from the training data items. Similarly, the target data 805 may be vectorized and/or tokenized to generate vectors comprising tokens extracted for model testing. In this embodiment, tokenization translates the data items into words and/or data elements for purposes of relating them with their corresponding queries to compute the semantic distances or scores between them at element 807 of the process. Alternatively, data items may be vectorized to determine the vector distance between them with queries or other data at element 807 of the process. In the context of tokenized log data, the determined distance can be used in turn produce a plurality of semantic score values 809 corresponding to the data. The computed semantic scores of the training data can be used to train a machine learning model to predict semantic distances or scores from input data as described in the embodiments above. This trained machine learning model can be used as a base machine learning model 213 in the illustrative embodiment. The base machine learning model 213 may continue to be refined in response to additional queries and ingested data, at least in accordance with the previously discussed embodiments for model training and model testing. In one embodiment, a contextual parameter related to the queries and/or dataset may be provided to improve or tailor the model to specific anticipated contexts relevant to the dataset. This may accelerate or simplify the training process.

In the illustrative embodiment, a modulation function 811 may then be used to transform the reference scores 809 into a statistical distribution, wherein the respective amplitudes of the transformed semantic scores are based on the respective score values of the transformed semantic scores. In the example embodiment, a sine function may be used as the modulation function to facilitate identifying patterns in the amplitudes of the semantic scores. It is contemplated that other modulation functions, such as a combination of wave functions or a polynomial function, may be used. In the illustrative embodiment, the reference scores 809 are transform into a signal-like wave, which may be represented as a sinusoidal or polynomial function (e.g., using curve fitting, Fourier transforms, and/or the like) that becomes the filtering function.

In the illustrative embodiment, the trained machine learning model 813 may then be used to filter an input data stream 815. In the context of a log based infrastructure, the input data stream 815 may be a stream of log data, in text format. Data from the input data stream may be scored using the training base machine learning model 813 to predict a semantic score 819 for the input data stream 815. The predicted score 219 can then be fit or otherwise compared to the polynomial of the filtering function using, for instance, a polynomial fit function 825 (PolyFit) that specifies a type of fit to perform (e.g., linear regression (LinReg)) along with polynomial variables X and Y. In one embodiment, the filtering platform 119 can also extrapolate the curve fit of the input data stream 815 (e.g., via an extrapolation process 821) to find a closest neighbor (e.g., closest previously scored data items with respect to their semantic distances or scores) to determine whether, for example, the semantic score of the input data 815 fits under the curve (e.g, via an under the curve check 817) of the semantic filtering function to determine a match or no match 823 for filtering. In this embodiment, input data that fits under the curve of the semantic filtering function corresponds to data that is to be ingested and not filtered. In contrast, data that does not fit under the curve can be filtered because their amplitudes of the semantic distance are beyond the threshold for classification as potentially relevant or responsive data that is to be ingested. In these examples, data not retained may be discarded to avoid the resources and/or expense needed to ingest them into the data logging system 111. For example, third-party data logging systems 111 often charge based on the amount of ingested data. Therefore, filtering unnecessary data results in reducing associated costs and fees from charged by third-party data logging systems 111. Returning to FIG. 1, as shown, the system 100 includes the filtering platform 119 for providing semantic filters according to the various embodiments described herein. In one embodiment, the filtering platform 119 includes or is otherwise associated with one or more machine learning models (e.g., neural networks) for making predictions or classifications of semantic distances or scores according to the embodiments described herein. In one embodiment, the filtering platform 119 has connectivity over the communication network 109 to the services platform 103 that provides one or more services 101 that are monitored by one or more monitoring tools corresponding to log sources 105. By way of example, the services 101 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the data logging system 111 uses the output of the filtering platform 119 to reduce the amount of log data ingested from the services 101 and log sources 105.

In one embodiment, the filtering platform 119 may be a platform with multiple interconnected components. The filtering platform 119 may include multiple servers, intelligent networking devices, computing devices, components and corresponding software for asymmetric evaluation of polygon similarity according to the various embodiments described herein. In addition, it is noted that the filtering platform 119 may be a separate entity of the system 100, a part of the one or more services 101, a part of the services platform 103, or included within the client terminal 127.

In one embodiment, the filtering platform 119, log sources 105, and/or client terminal 127 may execute a software application to receive queries and/or pre-filter new data, such as database logs. By way of example, the application may also be any type of application that is executable on the platform, such as content provisioning services, data management applications, database search applications, server maintenance applications, security applications, and the like. By way of example, the client terminal 127 may be any type of embedded system, mobile terminal, fixed terminal, or portable terminal including a network connected device, station, unit, device, multimedia computer, Internet node, desktop computer, laptop computer, notebook computer, netbook computer, tablet computer, personal communication system (PCS) device, personal digital assistants (PDAs), or any combination thereof, including the accessories and peripherals of these devices, or any combination thereof. It is also contemplated that the platform implementing the HSLP can support any type of interface to the user (such as "wearable" circuitry, etc.).

In one embodiment, the communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for 5G New Radio (5G NR or simply 5G), microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the elements of the system 100 communicate with each other and other components using well known, new or still developing protocols. In this context, a protocol includes a set of rules defining how the network nodes within the communication network interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The processes described herein for providing semantic filtering may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
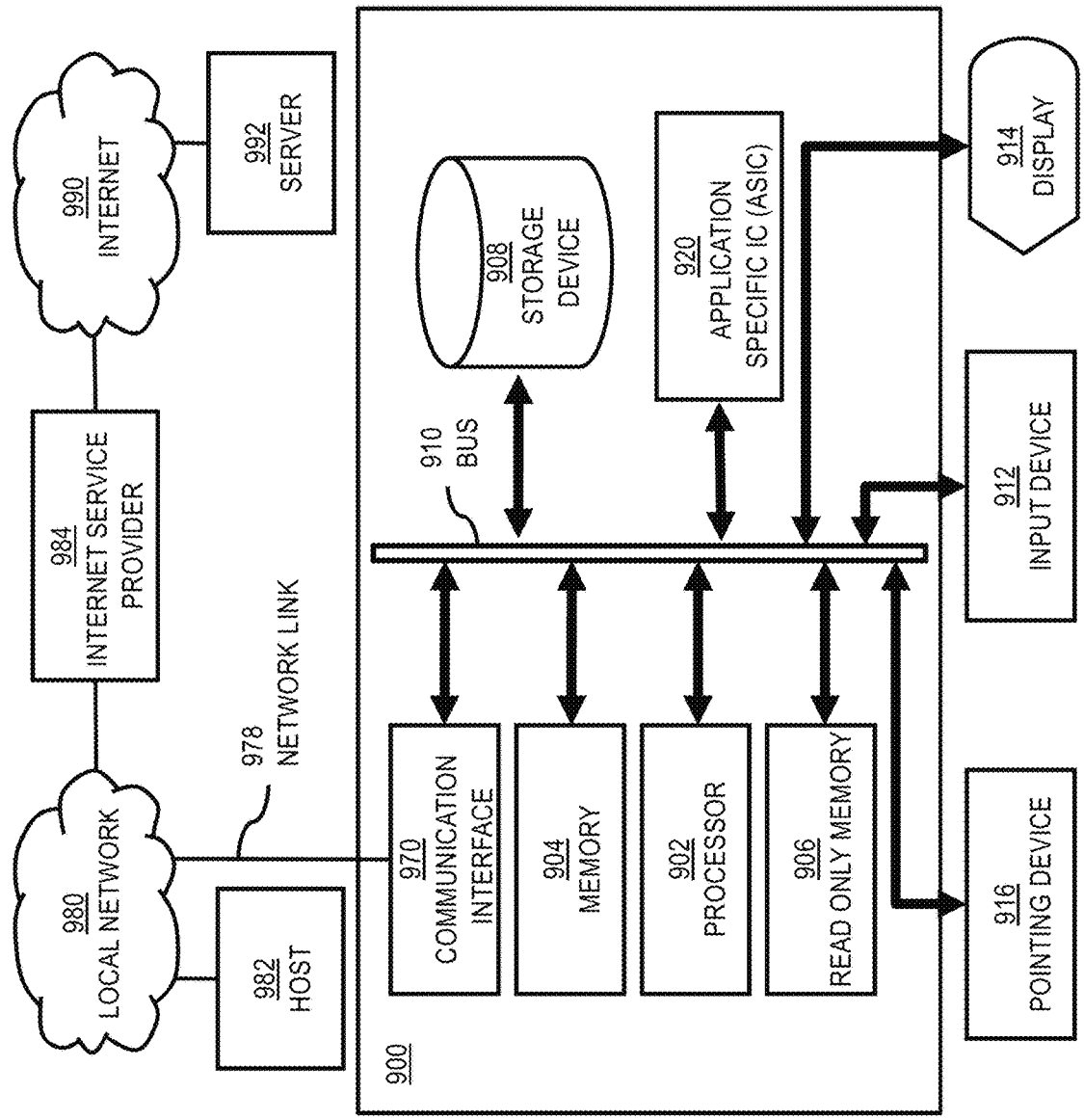
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to provide semantic filtering as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing semantic filtering. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing semantic filtering. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing semantic filtering, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 109 for providing semantic filtering.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide semantic filtering as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide semantic filtering. The memory 1005 also stores the data associated with or generated by the execution of the inventive steps.

Figure 11:
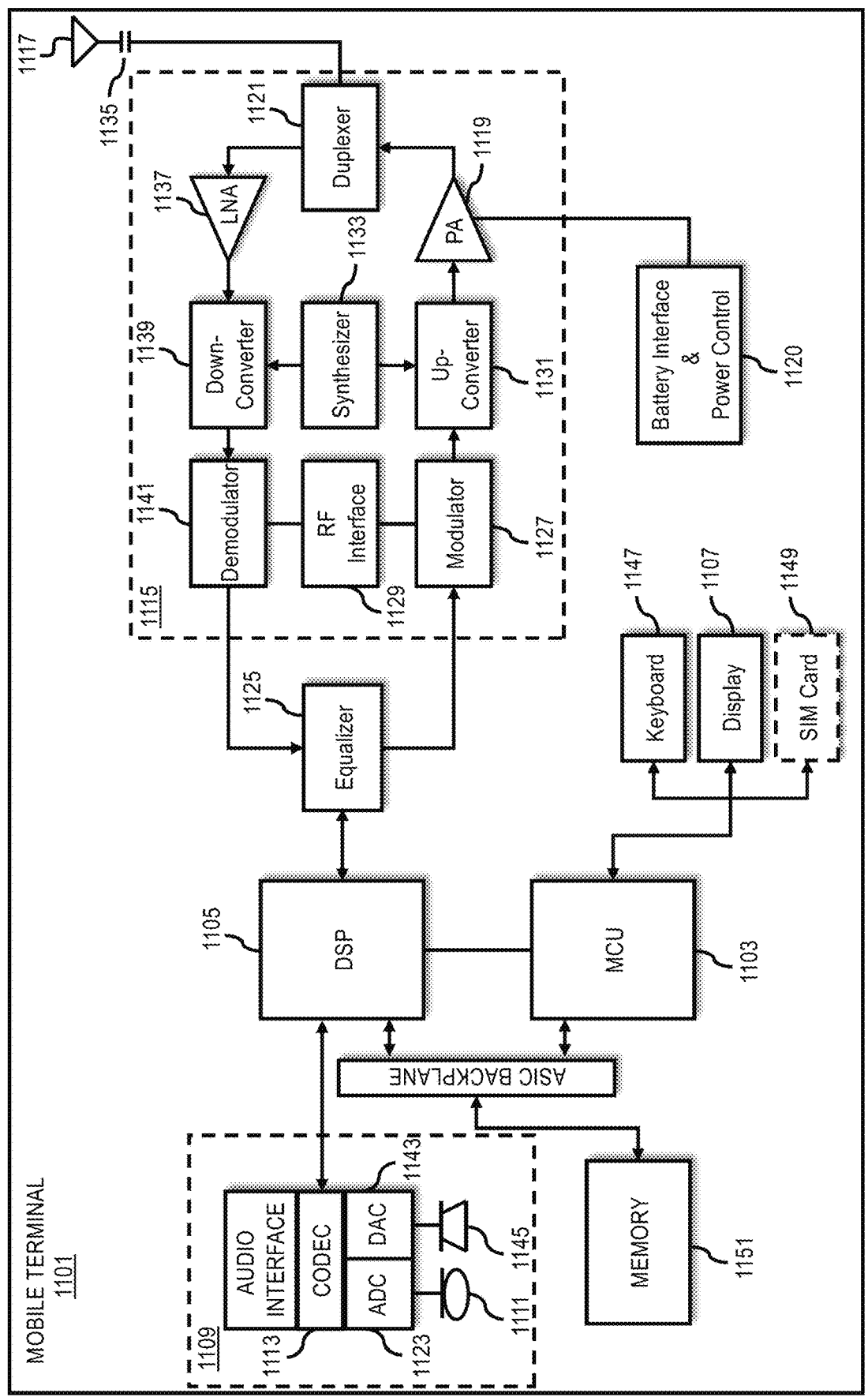
FIG. 11 is a diagram of a mobile terminal (e.g., handset) that can be used to implement an embodiment.

FIG. 11 is a diagram of exemplary components of a mobile terminal 1101 (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide semantic filtering. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing semantic filtering comprising:
   retrieving training data comprising a plurality of training data items responsive to a plurality of training queries conducted in a data system;
   performing, by one or more processors, a vectorization and a tokenization of the training data to generate a plurality of vectors comprising a plurality of tokens extracted from the plurality of training data items;
   computing, by the one or more processors, a plurality of reference semantic scores for the plurality of vectors based on a semantic distance between the plurality of tokens;
   transforming, by the one or more processors, the plurality of reference semantic scores into a plurality of transformed reference semantic scores based on a modulation function;
   fitting, by the one or more processors, a filtering function to the plurality of transformed reference semantic scores; and
   filtering, using the filtering function, an input data stream of the data system to reduce an amount of data processed by the data system.

2. The method of claim 1, wherein the modulation function is a wave function, and wherein the filtering function is a polynomial function.

3. The method of claim 1, further comprising:
   training, by the one or more processors, a machine learning model to predict semantic scores for the input data stream based on the training data,
   wherein the input data stream is filtered by comparing the predicted semantic scores to the filtering function.

4. The method of claim 1, wherein the modulation function produces a statistical distribution of the plurality of transformed reference semantic scores.

5. The method of claim 4, wherein respective amplitudes of the plurality of the transformed semantic scores in the distribution are based on respective score values of the plurality of the transformed semantic scores.

6. The method of claim 4, wherein the filtering function that is fit to the distribution corresponds to a curve such that an area under the curve of the filtering function indicates a first set of semantic scores associated with a first portion of the input data stream that are not to be filtered.

7. The method of claim 6, wherein an area above the curve of the filtering function indicates a second set of semantic scores associated with a second portion the input data stream that are to be filtered.

8. The method of claim 1, wherein the training data is associated with at least one contextual parameter, and wherein the filtering function is generated with respect to the at least one contextual parameter.

9. The method of claim 1, wherein the plurality of tokens includes a plurality of words in the plurality of data items.

10. The method of claim 1, wherein the data system is a log server, and wherein the plurality of data items is a plurality of system logs.

11. An apparatus for providing filtering comprising:
at least one processor; and
at least one memory including computer program code for one or more programs,
the at least one memory and the computer program code configured to, with the at least one processor, cause the apparatus to perform at least the following:
receive a data item;
predict a semantic score for the data item, wherein the semantic score indicates a semantic distance between one or more tokens extracted from the data item, one or more historical queries, or a combination thereof;
filter the data item from a data stream to be ingested by a data system based on a comparison of the semantic score to a filtering function,
wherein the filtering function defines a curve delineating a plurality of semantic score amplitudes that differentiate between a filterable data item and a non-filterable data item.

12. The apparatus of claim 11, wherein the semantic score is predicted using a trained machine learning model.

13. The apparatus of claim 11, wherein the comparison is performed using a polynomial fit function.

14. The apparatus of claim 11, wherein the comparison comprises determining whether the semantic scores in an area under the curve or an area above the curve.

15. The apparatus of claim 11, wherein the filtering function is based on fitting a polynomial function to statistical distribution of a plurality of semantic scores computed for a set of results for a plurality of historical data queries performed on the data system.

16. A non-transitory computer-readable storage medium for providing semantic filtering carrying one or more sequences of one or more instructions which, when executed by one or more processors, cause an apparatus to perform:
retrieving training data comprising a plurality of training data items responsive to a plurality of training queries conducted in a data system;
performing a tokenization of the training data to generate a plurality of vectors comprising a plurality of tokens extracted from the plurality of training data items;
computing a plurality of reference semantic scores for the plurality of vectors based on a semantic distance between the plurality of tokens;
transforming the plurality of reference semantic scores into a plurality of transformed reference semantic scores based on a modulation function;
fitting a filtering function to the plurality of transformed reference semantic scores; and
filtering, using the filtering function, an input data stream of the data system to reduce an amount of data processed by the data system.

17. The non-transitory computer-readable storage medium of claim 16, wherein the modulation function is a wave function, and wherein the filtering function is a polynomial function.

18. The non-transitory computer-readable storage medium of claim 16, wherein the modulation function produces a statistical distribution of the plurality of transformed reference semantic scores.

19. The non-transitory computer-readable storage medium of claim 18, wherein respective amplitudes of the plurality of the transformed semantic scores in the distribution are based on respective score values of the plurality of the transformed semantic scores.

20. The non-transitory computer-readable storage medium of claim 19, wherein the filtering function that is fit to the distribution corresponds to a curve such that an area under the curve of the filtering function indicates a first set of semantic scores associated with a first portion of the input data stream that are not to be filtered.

* * * * *